United States Patent [19]

Si et al.

[11] Patent Number: 4,835,728
[45] Date of Patent: May 30, 1989

[54] DETERMINISTIC CLOCK CONTROL APPARATUS FOR A DATA PROCESSING SYSTEM

[75] Inventors: Stephen S. C. Si, Milpitas; Eugene T. Wang, Fremont; Jongwen Chiou, San Jose, all of Calif.

[73] Assignee: Amdahl Corporation, Sunnyvale, Calif.

[21] Appl. No.: 896,415

[22] Filed: Aug. 13, 1986

[51] Int. Cl.$^4$ .............................................. G06F 1/04
[52] U.S. Cl. ...................................... 364/900; 328/63
[58] Field of Search ................... 328/60, 61, 63, 72, 328/73; 375/108; 364/200, 900

[56] References Cited

U.S. PATENT DOCUMENTS

| | | | |
|---|---|---|---|
| 4,241,418 | 12/1980 | Stanley | 328/72 X |
| 4,295,220 | 10/1981 | Blum et al. | 364/200 X |
| 4,316,247 | 2/1982 | Iwamoto | 364/200 |
| 4,374,361 | 2/1983 | Holden | 375/108 X |
| 4,466,110 | 8/1984 | Kizaki et al. | 328/73 X |
| 4,613,979 | 9/1986 | Kent | 375/108 |

Primary Examiner—David L. Clark
Attorney, Agent, or Firm—Fliesler, Dubb, Meyer & Lovejoy

[57] ABSTRACT

A clock control apparatus that stops a system clock in a high performance high speed computer a determined number of system clock cycles after the generation of the clock control signal by a digital computer. The apparatus receives a basic clock signal and the clock control signal and generates a system clock for the system. The system clock includes a normal system clock signal and at least one early system clock signal. The basic clock is provided through a delay tap generating a normal basic clock signal and at least one early basic clock signal. In addition, a control state machine receiving the normal basic clock signal and the at least one early basic clock signal and responsive to the clock control signal is provided for starting and stopping the system clock. The clock control signal is synchronized with the earliest system clock and supplied to the clock control state machine.

10 Claims, 7 Drawing Sheets

DETERMINISTIC CLOCK CONTROL APPARATUS FOR A DATA PROCESSING SYSTEM

FIELD OF THE INVENTION

The present invention relates to clock control circuits used in information processing systems, and in particular to circuits for stopping a system clock in response to a control signal generated by the system.

BACKGROUND OF THE INVENTION

In digital computer systems, a timing signal called the clock is used to provide timing reference for communication between functional units of the system. The abilities to start and stop the clock and to issue one clock pulse (single cycle) are required for the clock control logic. When errors are detected in the computer system, the clock is stopped, freezing the state of the system and preventing errors from propagating to the entire system. In most high speed, high performance computer systems, it usually takes several clock cycles to stop the clock after an error occurs. In prior art designs of the clock control circuitry, such as that of the Amdahl 5870 computer, the number of clock cycles it takes to stop the clock depends on whether the system clock is being single cycled or running at full speed. It takes fewer cycles to stop the clock in single cycle mode than in full speed mode. This makes debugging the computer complicated.

The clock signal is distributed to different units in the computer system through a clock distribution network. The propagation delay from the clock source to each subunit designed to be equal, so that each subunit receives the same clock pulse at the same time.

The total delay from the clock source to each subunit is the sum of all of the wiring delay and the propagation delay on the logic gates. Due to the physical layout of the computer system, the wiring propagation delay from the clock source to each unit may or may not be equal. Units whose physical location is closer to the clock source will have less wiring delay than units whose physical location is further away. The propagation delay and the wiring delays are adjusted using delay chains so that the total delay from the clock source to each subunit is the same.

In current systems, instead of using one delay chain for each unit, one main delay chain is used. Each unit taps its clock signal off the main delay chain at different places to equalize delays for all the clock signals. This implementation saves hardware, for some of the delay hardware can be shared among different units.

Clocks tapped off from the beginning of the delay chain are called "early" clocks. Similarly, a clock tapped off from the end of the delay chain is called a "late" clock and a clock tapped off from the middle of the delay chain is called a "normal" clock. Normal clocks are "late" with respect to early clocks. The timing of early, normal and late clocks is relative. The degree of earlyness and lateness is measured in seconds, nanoseconds, etc. A 5 nanoseconds early clock will be active 5 nanoseconds before the normal clock becomes active.

Two kinds of clock signals are mentioned in this application; the basic clock and the system clock.

The basic clock, typically generated from an oscillator, is used to provide timing reference for the clock control circuitry. The basic clock runs at all times and cannot be stopped by the clock control circuitry.

The system clock is used to provide timing references for units in the system other than the clock control. One important characteristic of the system clock which is different from the basic clock is that the system clock can be started and stopped, and one clock pulse can be issued (single cycle). When an error is detected in the computer system, the system clock is stopped to freeze the state of the machine so that error recovery can take place.

Figure 1:
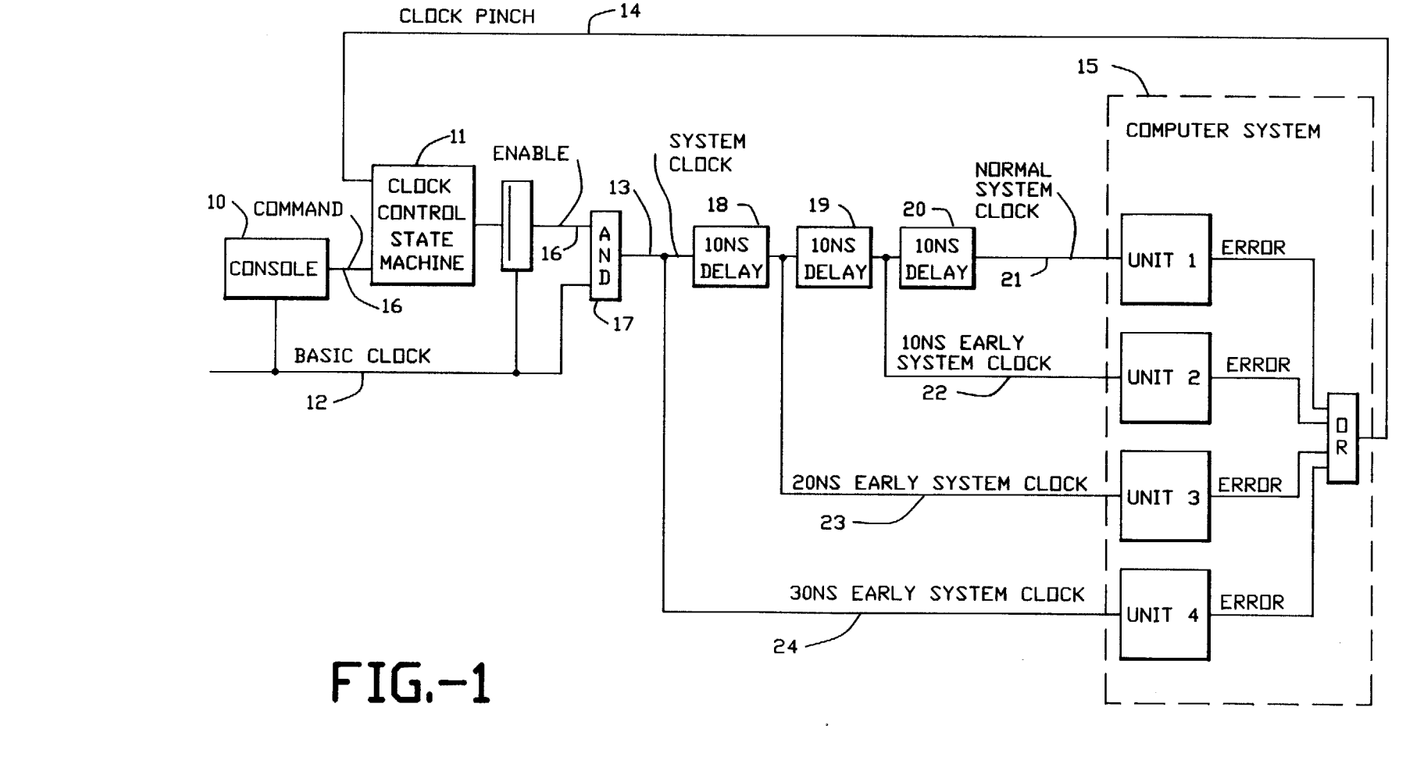
FIG. 1 illustrates an ideal case clock control circuit as an aid in discussing the background of the present invention.

FIG. 1 shows the block diagram of a clock control circuit for an ideal case. The conventional way of obtaining system clock 13 is to use a state machine 11 to generate a clock enable signal 16, and then to combine the enable signal 16 with the basic clock signal 12 in AND gate 17. System clock 13 is delayed by delay lines 18, 19 and 20 to generate normal system clock 21, 10 ns early system clock 22, 20 ns early system clock 23, and 30 ns early system clock 24 to match the wiring delay from clock control to the computer system 15.

The console 10 shown in the figure is a service processor which runs off the basic clock 12. It monitors the activity of the main computer. The console runs diagnostic programs when errors occur in the main computer. If the error is recoverable, then error recovery takes place. Another function of the console is to provide interface between the computer and the operator. Operator commands can be issued to the main computer through the console. One set of commands which is crucial to error recovery and to the operator is the system clock control commands. The clock control commands are used to start, to stop, and to single cycle the system clocks.

The clock control state machine 11 and the console 10 run under basic clock 12. This is necessary, for if system clock 13 were used, when the system clock was stopped, there would be no clock signal to the console 10 and the state machine 11. The state machine 11 and the console 10, therefore, could not change state anymore.

There are other signals generated by the system that can stop the system clock 13. The clock pinch signal 14, for instance, indicates that errors have been detected in the system and the system clock needs to be stopped to prevent the error from propagating to the entire machine.

The timing relation of the enable 16 and the basic clock signal 12 is adjusted so that the enable signal always switches during the window of the basic clock signal 12 in which it is not active.

The generation of early and late clocks needs to be cycle time independent. When the cycle time of the oscillator generating the basic clock changes, the early and late relationship with respect to the normal clock should remain fixed. That is, a 5 nanoseconds early clock should always lead the normal clock by 5 nanoseconds, regardless of whether the cycle time is 15 nanoseconds or 50 nanoseconds. As mentioned before, enable signals used to stop and start system clocks are adjusted so that the enable signal does not switch when the basic clock signal is active. This implies that enable signals have the same timing as the basic clock signals with which they are ANDed. Therefore, an early enable signal whose timing is sufficiently early to match the earliest basic clock is needed. Enable signals of other timing can be generated by delaying this early enable signal. One method of achieving the early enable is to employ a so-called early-up chain.

Figure 2:
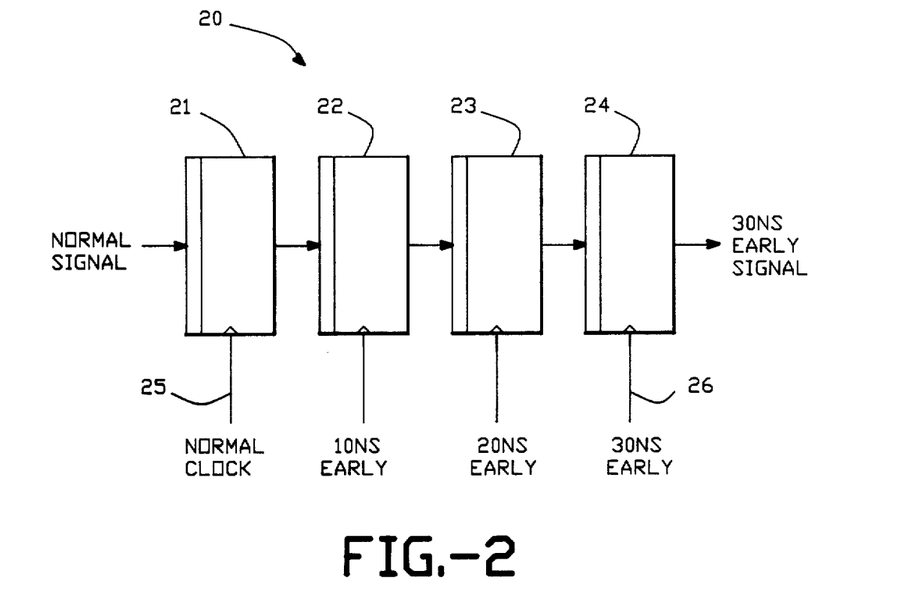
FIG. 2 is a diagram of an early-up chain used for synchronizing a normal signal with an early clock signal.
Figure 3:
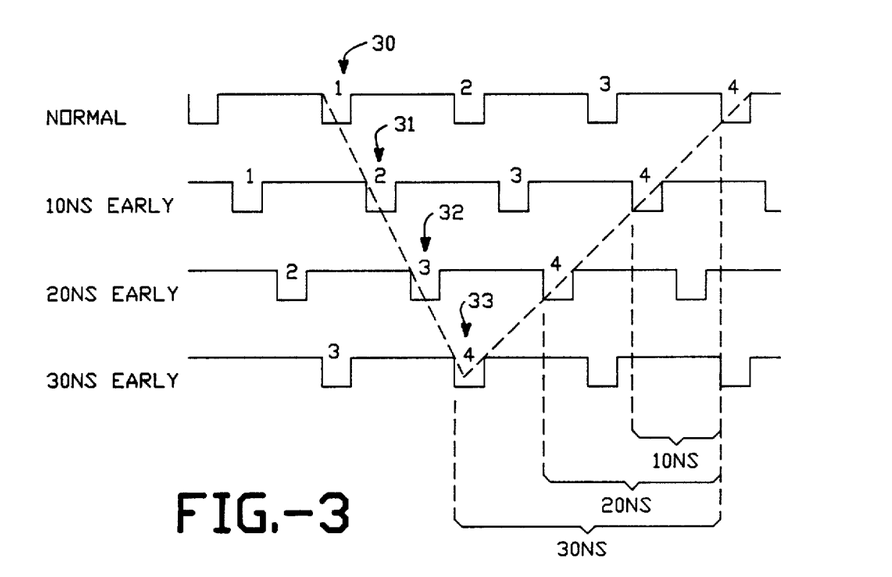
FIG. 3 is a timing diagram illustrating the operation of the early-up chain shown in FIG. 2.

FIG. 2 and FIG. 3 show a block diagram and clock signal timing diagram, respectively, of the early-up chain 20. The early-up chain 20 is a set of latches 21, 22, 23, 24 connected in a chain. Each latch runs on a different timing clock. The normal clock 25 latches the head latch 21 of the chain. The clocks get earlier and earlier until the end of the chain, where the clock 26 is the earliest. A normal signal going through this chain will be synchronized with an early clock signal. This early clock synchronized signal is then incrementally delayed to provide signals synchronized with later clocks. For example, assume the cycle time is 15 nanoseconds and the clocks to the early-up chain are 10 nanoseconds early at latch 22, 20 nanoseconds early at latch 23, and 30 nanoseconds early at latch 24. It can be seen in FIG. 3 that a signal asserted at cycle one 30 of the normal clock will be latched in cycle two 31 of the 10 nanoseconds early clock, and its output will be in turn latched in cycle three 32 of the 20 nanoseconds early clock. Finally, the signal will be latched in cycle four 32 of the 30 nanoseconds early latch. The output of latch 24 is synchronized with cycle four of the 30 nanoseconds early clock. It can then be incrementally delayed to provide signals synchronized with later clocks. It takes four clock cycles for a normal signal to go through the four latch early-up chain including the delay. If the cycle time changes, the result is the same; it still takes four clock cycles for a normal signal to go through the early-up chain plus equalizing delay. The cycle time and the timing of the clocks mentioned the previous example are for convenience of calculation. Other numbers may be used as long as the timing difference between one clock and the next earlier clock plus logic delay from one latch to the next latch is less than the total cycle time.

Figure 4:
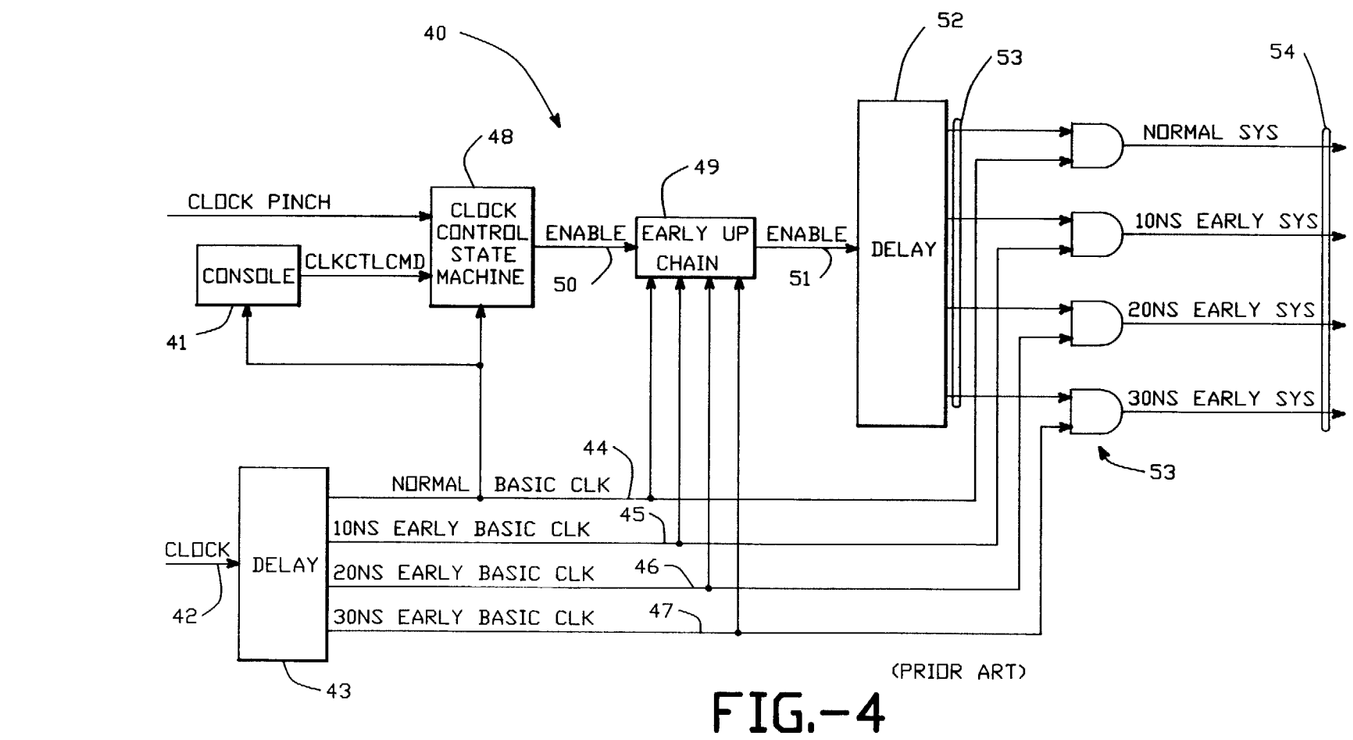
FIG. 4 is a diagram of a clock control circuit which typifies the prior art.

A typical implementation of a prior art system clock control circuit 40 is seen in FIG. 4. The console 41 issues system clock control commands to start, stop and single cycle the system clocks. The basic clock signal 42 from an oscillator (not shown) is incrementally delayed 43 to generate normal 44, and three different early clocks 45, 46, 47. The system clock control state machine 48 and the early-up chain 49 run under basic clocks. After going through the early-up chain 49, normal enable signal 50 generated by the state machine 48 becomes early enable signal 51. The early enable signal 51 is then incrementally delayed 52 to generate enable signals 53 with the correct timing with respect to the basic clock signals 44, 45, 46, 47 from which system clocks 54 are formed through AND gates 55.

In this embodiment, only one early-up chain running off the basic clock is used for the enable signal. When the system clock pinch signal is not active, the system clock stops and starts on the same cycle boundary regardless of the cycle time of the basic clock.

However, a problem arises when the clock pinch signal is active and the system clock is being single cycled. When in single cycle mode, the basic clocks to the state machine and the early-up chain are all running at speed. The only clock being single cycled is the system clock. Since the basic clock to the early-up chain is running, the enable signal will be able to go through the early-up chain to stop the system clock. It takes five basic clock cycles to stop the system clock (one cycle for state machine, four cycles for the early-up chain). However, it takes an indeterminate number of system cycles, because in single cycle the number of system and basic clock pulses do not match. When the number of system cycles between the time of a system error and the time that the system clock is stopped depends on circumstances at the time of the error, analysis of the state of the system as of the time of the error is difficult.

SUMMARY OF THE INVENTION

The present invention provides a clock control apparatus for an information processing system that stops a system clock a determined number of system clock cycles after the generation of the stop clock condition by the system.

In an information processing system that generates a stop clock signal, the present invention is an apparatus receiving a basic clock signal, a set of clock control signals generated by a console and the stop clock signal for generating a system clock. The system clock includes a normal system clock signal and at least one early system clock signal. The apparatus comprises means for incrementally delaying the basic clock signal to provide a normal basic clock signal and at least one early basic clock signal. In addition, a control means receiving the normal basic clock signal and the at least one early basic clock signal and responsive to the console generated clock signals at all times and to the stop clock signal when the system clock is running, is provided for starting, stopping and single cycling the system clock. Means receiving the clock control signal and the system clock is provided for synchronizing the system generated stop clock signal with the earliest system clock signal and supplying the synchronized clock control signal to the clock control means.

By synchronizing the stop clock signal with the system clock, the system clock control state machine is enabled to stop the system clock a determined number of system clock cycles after the generation of the clock stop signal by the information processing system.

DETAILED DESCRIPTION OF THE INVENTION

With reference to the FIGS. 5, 6, 7 and 8, a detailed description of the invention is provided. First, with reference to FIG. 5, an overview block diagram is described. Next, with reference to Figs. 6, 7 and 8, a detailed implementation of a preferred embodiment is disclosed.

Figure 5:
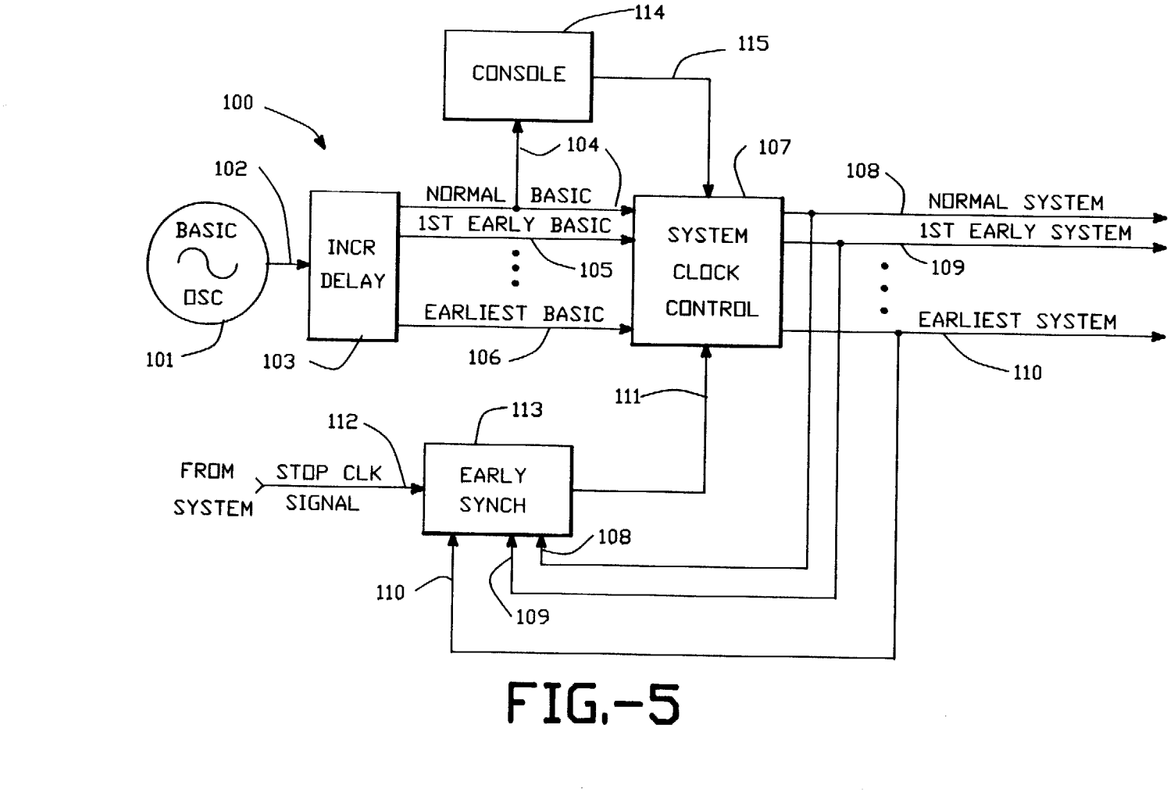
FIG. 5 is a block diagram of the present invention.

FIG. 5 illustrates an overview block diagram of a clock control system 100 for use in an information processing system according to the present invention. The clock control system 100 includes a basic clock oscillator 101 which generates a basic clock signal 102. The basic clock signal 102 is supplied to a means 103 for incrementally delaying the basic clock signal 102 to provide a plurality of incrementally delayed basic clocks including a normal basic clock 104, and at least one early basic clock 105. An earliest basic clock 106 of the plurality is shown for the purpose of this description. The means 103 for incrementally delaying the basic clock can be implemented with a delay chain or other delay tap as known in the art. Typically, the timing difference between the normal basic clock and each incrementally earlier clock is a constant increment, but it need not be.

The normal basic clock 104 and each of the earlier basic clocks 105, 106 are supplied to a system clock control means 107 for providing a corresponding normal system clock 108, and at least one early system clock 109 including an earliest system clock 110. The system clock control means 107 also receives a synchronized control signal on line 111.

A stop clock signal 112, such as a clock pinch signal is generated by the information processing system indicating that the system clock should be stopped. The control signal 112 is supplied to a means 113 for synchronizing the control signal 112 with the earliest system clock 110. The synchronized signal is supplied on line 111 to the system clock control means 107. The means 113 for synchronizing the control signal 112 with the earliest system clock 110 is implemented by an early-up chain in the preferred embodiment. As shown in FIG. 5, the system clock, including the normal system clock 108, and the at least one early system clock 109 including the earliest system clock 110, is supplied to the means 113 for synchronizing the control signal with the earliest system clock.

A console 114, which runs on the normal basic clock 104, controls the stopping, starting, and single cycling of the system clocks 108, 109 and 110 through a set of command lines 115 to the system clock control means. The interface between the console 114 and the system clock control means 107 is asynchronous.

Figure 6:
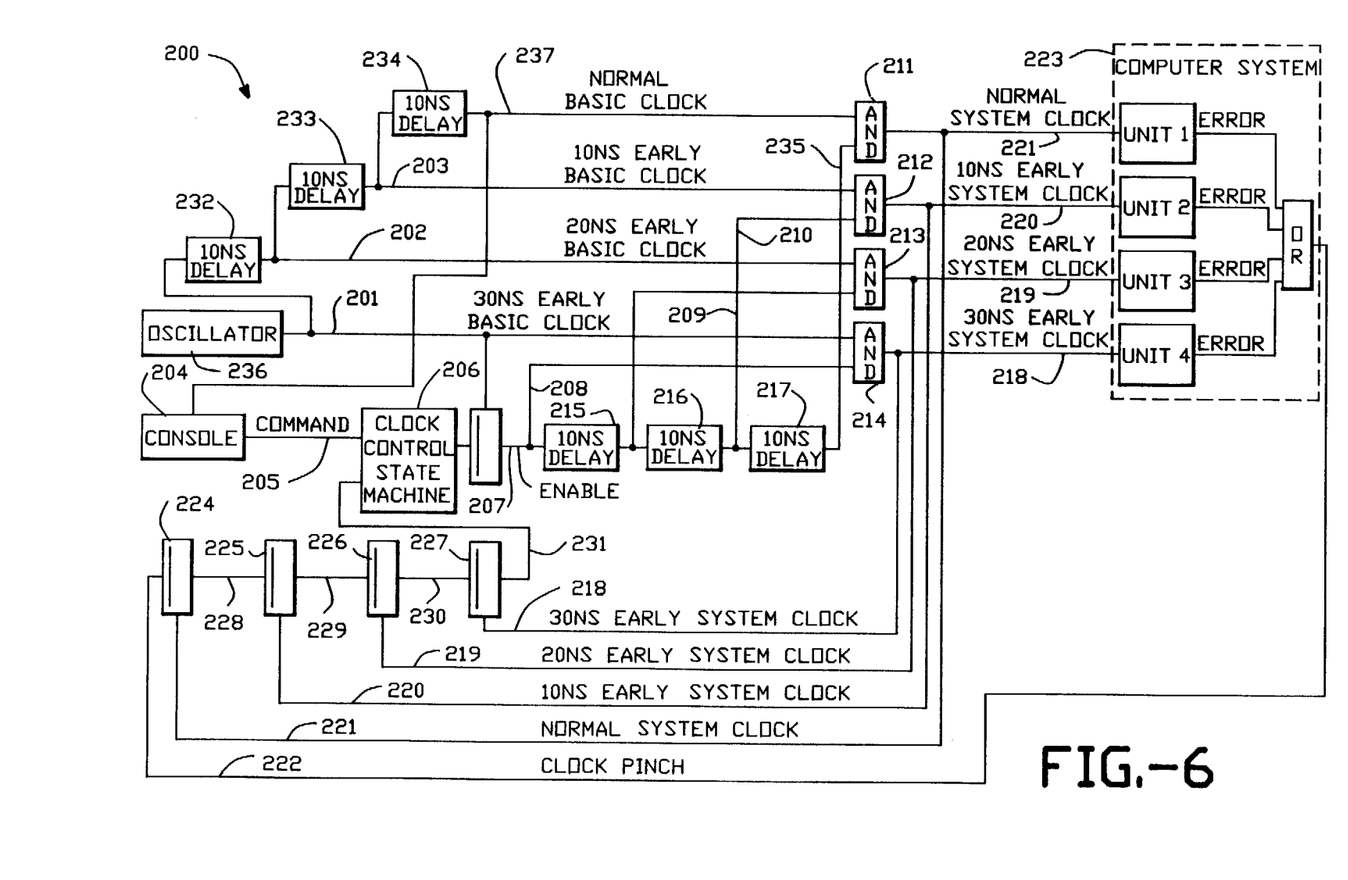
FIG. 6 is a more detailed block diagram of a preferred implementation of the present invention.

FIG. 6 illustrates a preferred embodiment of the present invention. In the preferred embodiment, the stop clock signal is the clock pinch signal 222 generated by the system upon the detection of an error. The clock pinch signal 222 is supplied to the system clock control state machine 206 through an early-up chain formed by latches 224, 225, 226 and 227 running under system clock 221, 220, 219 and 218, respectively. The console 204 can generate commands for stopping, starting and single cycling the system clock. The commands are sent to the system clock control state machine 206 through lines 205. The interface between the console 204 and the system clock control 206 is asynchronous. The system clock control state machine 206 generates a clock enable signal on line 207 in response to the clock control command signals 205 and the stop clock signal 231. The enable signal 207 is supplied through an incremental delay means formed by delay lines 215, 216 and 217 to produce a normal enable signal 235, a 10 ns early enable signal 210, a 20 ns early enable signal 209 and the 30 ns early enable signal 208 which is the earliest enable signal.

The oscillator 236 generates the basic clock. The basic clock is supplied through an incremental delay means formed by delay lines 232, 233 and 234 for supplying the normal basic clock 237, the 10 ns early basic clock 203, the 20 ns early basic clock 202 and the 30 ns early basic clock 201, which is the earliest in the system. These basic clock signals are supplied respectively to AND gates 211, 212, 213 and 214. The other input to the AND gates 211, 212, 213 and 214, respectively, are enable signals 235, 210, 209 and 208. The output of the AND gates 211, 212, 213 and 214 are the normal system clock 221, the 10 ns early system clock 220, the 20 ns early system clock 219 and the 30 ns early system clock 218, which is the earliest system clock, respectively.

Latches 224, 225, 226 and 227 form the early-up chain for the clock pinch signal 222. Latch 224 is clocked by the normal system clock 221; latch 225 is clocked by the 10 ns early system clock 220; latch 226 is clocked by the 20 ns early system clock 219 and latch 227 is clocked by the 30 ns early system clock 218, which is the earliest system clock. The clock pinch signal going through each latch point of the above early-up chain will be synchronized with the system clock by which the latch is clocked. At the end of the early-up chain, the pinch signal will be synchronized with the 30 ns system clock 218, which is the earliest system clock. The clock pinch which is synchronized with the earliest system clock is supplied to the state machine 206 through line 231.

The clock pinch signal is generated by the computer system 223 upon the detection of an error. Accordingly, the system clocks 221, 220, 219 and 218 should be stopped a determined number of system clock cycles after the generation of this signal.

The console 204 runs off the basic normal clock 237, and the clock control commands issued by the console to the system clock control 206 are asynchronous.

The system clock control state machine 206 is clocked by the 30 ns early basic clock, the earliest basic clock, to assure that any change in state of the state machine 206 occurs early enough for the worst case scenario. The state machine 206 samples the input lines 205 at all times and samples the clock pinch signal which is synchronized with the earliest system clock 231 only when the system clock state machine is in states in which the system clock is on. Any changes on lines 205 and 231, when the state machine is in the correct state, will result in changing of state of the 30 ns early enable signal 208, which is the earliest enable signal. The 30 ns early enable signal is supplied to delay means 215, 216 and 217 to form the normal enable signal 235, the 10 ns early enable signal 210 and the 20 ns early enable signal 209. The enable signals 208, 209, 210 and 235 are then supplied to AND gates 214, 213, 212 and 211 to form system clock 218, 219, 220 and 221.

Figure 7:
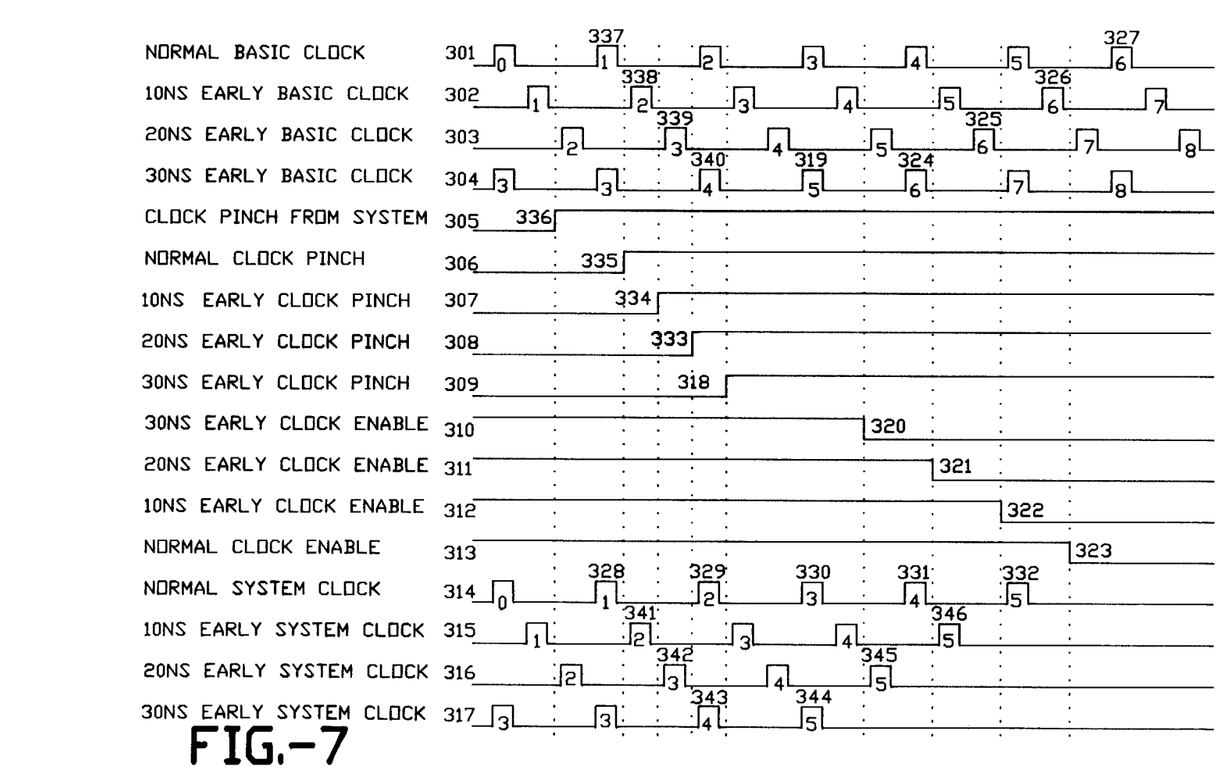
FIG. 7 is a timing diagram illustrating the operation of the embodiment shown in FIG. 6 when it is running at full speed.
Figure 8:
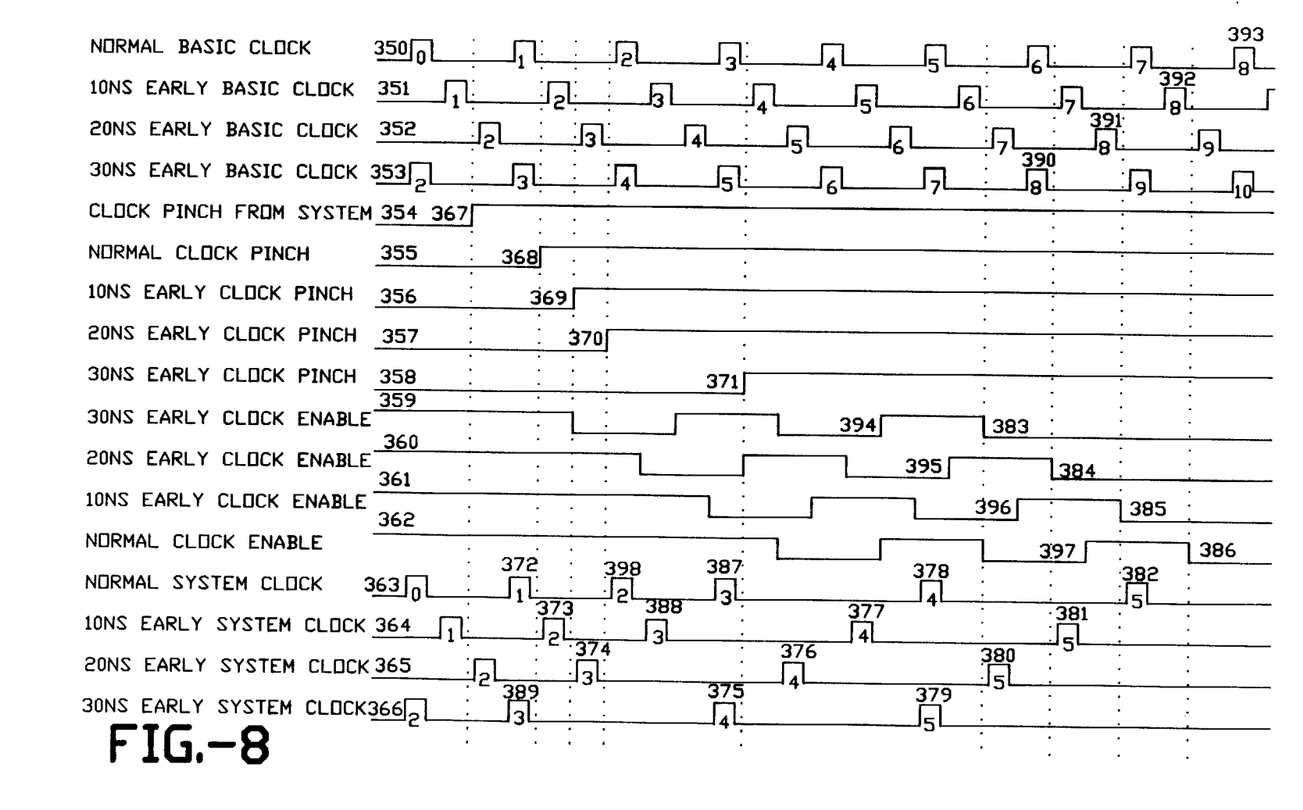
FIG. 8 is a timing diagram illustrating the operation of the embodiment shown in FIG. 6 when it is running in single cycle.

FIGS. 7 and 8 are timing diagrams illustrating the operation of the system clock control apparatus 200 of FIG. 6. FIG. 7 is the timing diagram of clock control apparatus 200 of FIG. 6 when it is operating at full clock speed; FIG. 8 is the timing diagram of clock control apparatus 200 of FIG. 6 when it is operating in single cycle. In the following sections, it will be shown that a fixed number of system clock pulses are issued after the generation of the clock pinch signal by the system whether or not the system clock is being single cycled.

FIG. 7 shows the normal basic clock 301, 10 ns early basic clock 302, 20 ns early basic clock 303, and the 30 ns early basic clock 304, which is the earliest basic clock, such as would be sampled on line 237, 203, 202 and 201 in FIG. 6, respectively. Clock pinch from system signal 305 shows the waveform on line 222 in FIG. 6. The normal clock pinch signal 306, the 10 ns clock pinch signal 307, the 20 ns early clock pinch signal 308 and 30 ns clock pinch signal 309 are waveforms measured on lines 228, 229, 230 and 231 in FIG. 6, respectively. The normal enable signal 313, the 10 ns early enable signal 312, the 20 ns early enable signal 311, and the 30 ns early enable signal 310 are waveforms measured on lines 235, 210, 209, and 208 in FIG. 6 respectively. Normal system clock 314, 10 ns early system clock 315, 20 ns early system clock 316, and 30 ns early system clock 317, which is the earliest system clock, are waveforms measured on lines 221, 220, 219 and 218 in FIG. 6, respectively.

The timing relationship between different basic clocks is explained below. Assume pulse 337 of the normal basic clock is used as the reference point. Pulse 337 is called the first pulse. Pulse 327 of the normal basic clock 301 is, therefore, the sixth pulse. Since the 10 ns early basic clock 302 is 10 ns earlier than the normal basic clock 301, the sixth pulse of the 10 ns early basic clock is pulse 326. Since the 20 ns early basic clock 303 is 20 ns earlier than the normal basic clock 301, the sixth pulse of the 20 ns early basic clock is pulse 325. Since the 30 ns early basic clock 304 is 30 ns earlier than the normal basic clock 301, the sixth pulse of the 30 ns early basic clock is pulse 324. Therefore, clock pulse 324, 325, 326 and 327 are the same pulse with different timing. A similar timing relationship can also be seen in the system clocks.

At time 336 the system generated clock pinch signal 305 changes state, indicating that the system clock should be stopped. When clock pulse 328 of the normal system clock 314 arrives, the pinch signal 305 will be latched up by latch 224 in FIG. 6, producing the change in state of normal clock pinch 306 at 335. This change in state will be latched up by latch 225 when clock pulse 341 occurs, producing the change in state of the 10 ns early clock pinch signal 307 at 334. This change in state will be latched up by latch 226 when clock pulse 342 occurs, producing the change in state of the 20 ns early clock pinch signal 308 at 333. At last the change in state on signal 308 will be latched up by latch 227 when clock pulse 343 occurs, producing the change in state of the 30 ns early clock pinch signal 309 at 318. Since the system clock is running at speed, when the 30 ns early clock pinch signal changes state at 318, the clock control state machine 206 is in clock on state. Therefore, the change at 318 will be sampled by the state machine and produce a change in state on the 30 ns early clock enable signal 310 at time 320. This change in state will then block the 30 ns early basic clock pulse 324 and all pulses after that. At the same time, the 30 ns early clock enable signal is delayed 10 ns, producing the state change on 20 ns early clock enable signal 311 at time 321. This change of state will then block the 20 ns basic clock pulse 325 and all pulses after that. The 20 ns early clock enable signal 311 is delayed 10 ns, producing the state change on 10 ns early clock enable signal 312 at time 322. This change of state will then block the 10 ns basic clock pulse 326 and all pulses after that. The 10 ns early clock enable signal 312 is again delayed 10 ns, producing the state change on normal clock enable signal 313 at time 323. This change of state will then block the normal basic pulse 327 and all pulses after that. Therefore, from the time when the clock pinch signal is generated to the time when the normal system clock is stopped, five system clock pulses 328, 329, 330, 331 and 332 are issued, four used up by the early-up chain and one used up by the state machine. For the 10 ns early, 20 ns early and 30 ns early clock, when the clock pinch signal is generated, there are already some clock pulses issued. However, the last clock pulse issued for the normal, 10 ns early, 20 ns early and 30 ns early system clocks are pulse 332, 338, 337 and 326, and all of them are the same clock pulse with a different timing. Therefore, a determined number of clock pulses are issued after a system generated clock pinch occurs.

FIG. 8 is the timing diagram of the preferred embodiment when it is operating in single cycle. FIG. 8 shown the normal basic clock 350, 10 ns early basic clock 351, 20 ns early basic clock 352 and the 30 ns early basic clock 353, which is the earliest basic clock, such as would be sampled on line 237, 203, 202 and 201 in FIG. 6, respectively. Clock pinch from system signal 354 shows the waveform on line 222 in FIG. 6. The normal clock pinch signal 355, the 10 ns clock pinch signal 356, the 20 ns early clock pinch signal 357 and 30 ns clock pinch signal 358 are waveforms measured on lines 228, 229, 230 and 231 in FIG. 6, repsectively. The normal enable signal 362, the 10 ns early enable signal 361, the 20 ns early enable signal 360 and the 30 ns early enable signal 359 are waveforms measured on lines 235, 210, 209 and 208 in FIG. 6, respectively. Normal system clock 363, 10 ns early system clock 364, 20 ns early system clock 365 and 30 ns early system clock 366, which is the earliest system clock, are waveforms measured on lines 221, 220, 219 and 218 in FIG. 6, respectively.

The normal system clock 363 is turned off by console 204 after pulse 387; the 10 ns early system clock 364 is turned off by console 204 after pulse 388; the 20 ns early system clock 365 is turned off by console 204 after pulse 374; the 30 ns early system clock 366 is turned off by console 204 after pulse 389. Pulse 375 of the 30 ns early system clock 366 is single cycled; pulse 376 of the 20 ns early system clock 365 is single cycled; pulse 377 of the 10 ns early system clock 364 is single cycled; pulse 378 of the normal system clock 363 is single cycled. At point 394 the 30 ns early system clock 366 is turned back on to run at full speed; at point 395 the 20 ns early system clock 365 is turned back on to run at full speed; at point 396 the 10 ns early system clock 364 is turned back on to run at full speed; at point 397 the normal system clock 363 is turned back on to run at full speed.

At time 367 the system generated clock pinch signal changes state, indicating that the system clock should be stopped. When clock pulse 372 of the normal system clock 363 arrives, the pinch signal 354 will be latched up by latch 224 in FIG. 6, producing the change in state of normal clock pinch 355 at 368. This change in state will be latched up by latch 225 when clock pulse 373 occurs, producing the change in state of the 10 ns early clock pinch signal 356 at 369. This change in state will be latched up by latch 226 when clock pulse 374 occurs, producing the change in state of the 20 ns early clock pinch signal 357 at 370. Since at this point the system clocks are single cycled, the change in state on signal 357 will be latched up by latch 227 when clock pulse 375 occurs, producing the change in state of the 30 ns early clock pinch signal 358 at 371. Since the system clock is being single cycled, when the 30 ns early clock pinch signal 358 changes state at 371, the clock control state machine 206 will not sample this signal until it is in clock on state after point 394. The 30 ns early clock enable signal 359 will change state at 383. This change in state will then block the 30 ns early basic clock pulse 390 and all pulses after that. At the same time, the 30 ns early clock enable signal is delayed 10 ns, producing the state change on 20 ns early clock enable signal 360 at time 384. This change of state will then block the 20 ns basic clock pulse 391 and all pulses after that. The 20 ns early clock enable signal 360 is delayed 10 ns, producing the state change on 10 ns early clock enable signal 361 at time 385. This change of state will then block the 10 ns basic clock pulse 392 and all pulses after that. The 10 ns early clock enable signal 361 is again delayed 20 ns, producing the state change on normal clock enable signal 362 at time 386. This change of state will then block the normal basic pulse 393 and all pulses after that. Therefore, from the time when the clock pinch signal is generated to the time when the normal system clock is stopped, five system clock pulses 372, 398, 387, 378 and 382 are issued, four used up by the early-up chain and one used up by the state machine. For the 10 ns early, 20 ns early and 30 ns early clock, when the clock pinch signal is generated, there are already some clock pulses issued. However, the last clock pulse issued for the normal, 10 ns early, 20 ns early and 30 ns early system clocks are pulse 382, 381, 380 and 379, and all of them are the same clock pulse with a different timing. Therefore, a determined number of clock pulses are issued after a system generated clock pinch occurs.

From FIGS. 7 and 8 and from the above description, it can be seen that a fixed number of clock pulses are issued after the generation of the clock pinch signal.

The embodiment shown in FIG. 6 illustrates one clock pinch signal 222. However, there can be any number of such signals indicating that the system clock should be stopped. Each signal can have its own early-up chain or can share a common early-up chain, and additional logic can be added to distinguish the signals from each other. Also shown in FIG. 6, the enable signal 207 is delayed to the proper timing and ANDed with the basic clock signals 237, 203, 202 and 201 to produce system clocks 221, 220, 219 and 218. It works equally well if the 30 ns basic clock 201 is ANDed with enable signal 207 to produce the 30 ns early system clock, and the 30 ns system clock is delayed to produce the 20 ns, 10 ns and normal system clocks. The timing of the system and basic clocks and the number of stages of the early-up chain are for the convenience of describing this invention. Other timing and different number of states of early-up chain are also possible. Of course, various embodiments of the state machine can be adapted to the present invention, and the interface between console and clock control state machine can be made synchronous by using early-up chains for the command lines.

The foregoing description of the preferred embodiment has been provided for the purpose of example and description of the present invention. It will be recognized by those skilled in the art that many variations and modifications of the preferred embodiment can be made without departing from the spirit of the invention. It is intended that the scope of the invention be defined solely by the following claims.

We claim:

1. In an information processing system that generates a clock control signal indicating that a system clock should be stopped, the system clock supplying a normal system clock signal and at least one early system clock signal of which one is an earliest system clock signal, an apparatus receiving a basic clock signal and the clock control signal, comprising:
    means for delaying the basic clock signal to provide a normal basic clock signal and at least one early basic clock signal including an earliest basic clock signal;
    a system clock control means, receiving the normal basic clock signal and the at least one early basic clock signal and responsive to the clock control signal for generating the normal system clock signal and at least one early system clock signal, wherein the normal system clock signal and the at least one early system clock signal have substantially equal system clock cycle times for corresponding cycles, and corresponding cycles of the at least one early system clock signal have a negative phase relative to the corresponding cycles of the normal system clock signal; and
    means, responsive to the normal system clock signal and the at least one early system clock signal, for synchronizing the clock control signal with the normal system clock signal and the at least one early system clock signal a determinate number of system clock cycles after generation of the clock control signal by the system.

2. The apparatus of claim 1, wherein the system clock control means includes:
    control means, responsive to the clock control signal, and the earliest basic clock signal for generating a system clock enable signal;
    means, receiving the enable signal, for delaying the enable signal to provide a normal enable signal and at least one early enable signal; and
    a plurality of enabling means, responsive to a respective pair of the normal enable signal and the normal basic clock signal or the at least one early enable signal and the at least one early basic clock signal, for enabling, respectively, the normal system clock signal and the at least one early system clock signal.

3. The apparatus of claim 1, wherein the means for synchronizing the clock control signal includes:
    means, receiving the clock control signal and the earliest system clock signal, for synchronizing the clock control signal with the earliest system clock signal and supplying the synchronized clock control signal to the system clock control means.

4. The apparatus of claim 3, wherein the means for synchronizing the clock control signal with the earliest system clock signal includes an early-up chain receiving the normal system clock signal and the at least one early system clock signal.

5. The apparatus of claim 2, wherein the means for synchronizing the clock control signal includes:
    means, receiving the clock control signal and the earliest system clock signal, for synchronizing the clock control signal with the earliest system clock signal and supplying the synchronized signal to the system clock control means.

6. The apparatus of claim 5, wherein the means for synchronizing the clock control signal includes an early-up chain receiving the normal system clock signal and the at least one early system clock signal.

7. In an information processing system including a plurality of functional units, each running in response to respective ones of a plurality of system clock signals, one of the functional units generating a clock control signal synchronized with its repsective one system clock signal, the plurality of system clock signals having corresponding system cycles of substantially equal periods, the plurality of system clock signals including an earliest system clock signal, and system cycles of the earliest system clock signal having a negative phase relative to the corresponding system cycles of other system clock signals in the plurality, an apparatus for supplying the plurality of system clock signals for distribution to the plurality of functional units in response to the clock control signal and a reference clock signal, comprising:

means, receiving the reference clock signal, for delaying the reference clock signal to provide a plurality of basic clock signals;
   means, receiving the clock control signal and the plurality of system clock signals, and responsive to the clock control signal, for generating an enable signal synchronized with the earliest system clock signal a determinate number of corresponding system cycles after the system cycle within which the clock control signal is received; and
   system clock control means, receiving the enable signal and the plurality of basic clock signals, for enabling or disabling generation of the plurality of system clock signals in corresponding system cycles, in response to the enable signal, and in response to the plurality of basic clock signals.

8. The apparatus of claim 7, wherein the functional unit supplying the clock control signal runs in response to one of the plurality of system clock signals other than the earliest system clock signal.

9. The apparatus of claim 7, wherein the system clock control means includes:
   means, receiving the enable signal, for delaying the enable signal to generate a plurality of clock enable signals, one enable signal corresponding to each of the plurality of basic clock signals; and
   a plurality of enable gates, each enable gate receiving one of the plurality of basic clock signals and the corresponding clock enable signal as inputs, and supplying one of the plurality of system clock signals as an output.

10. The apparatus of claim 7, wherein the plurality of basic clock signals have corresponding basic cycles of substantially equal periods, the plurality of basic clock signals include an earliest basic clock signal, and basic cycles of the earliest basic clock signal have a negative phase relative to the corresponding basic cycles of other basic clock signals in the plurality, and wherein the information processing system includes a console which runs in response to one of the plurality of basic clock signals and generates a clock stop signal that indicates when activated that the plurality of system clock signals should be stopped, and the system clock control means is further responsive to activation and deactivation of the clock stop signal and includes:
   means, receiving the enable signal and the clock stop signal, for supplying an output signal synchronized with the earliest basic clock signal; and
   means, receiving the output signal, for delaying the output signal to generate a plurality of clock enable signals, one enable signal corresponding to each of basic clock signals;
   a plurality of enable gates, each enable gate receiving one of the plurality of basic clock signals and the corresponding clock enable signal as inputs and supplying one of the plurality of system clock signals as an output.

* * * * *